June 7, 1927.  W. M. BROOKS  1,631,464
SEALING MEANS
Filed Nov. 11, 1925   2 Sheets-Sheet 1
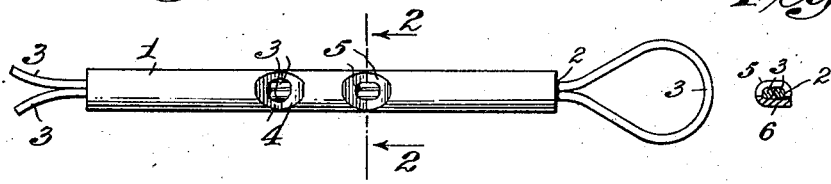
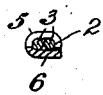
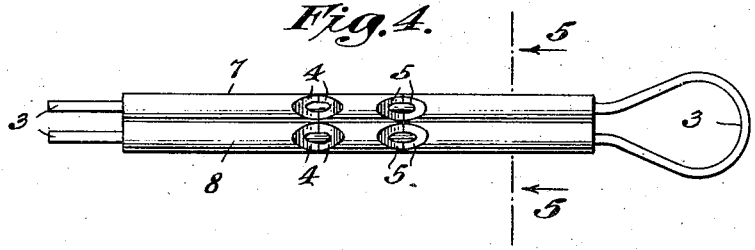
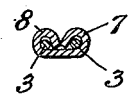
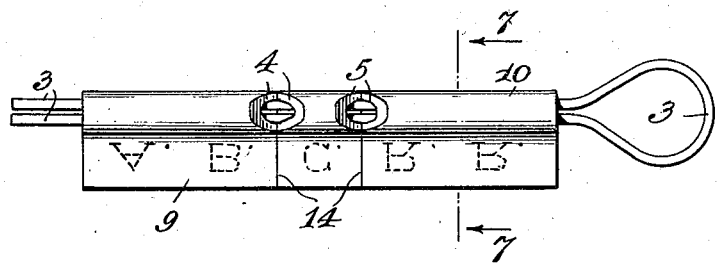
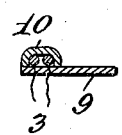
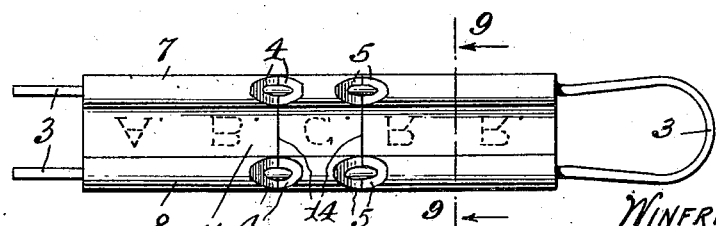
Inventor
WINFRED M. BROOKS
By his Attorney

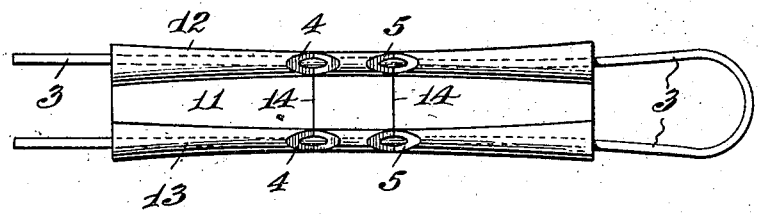
Fig. 10.
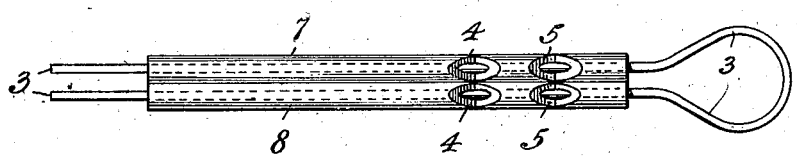
Fig. 11.
Fig. 12. 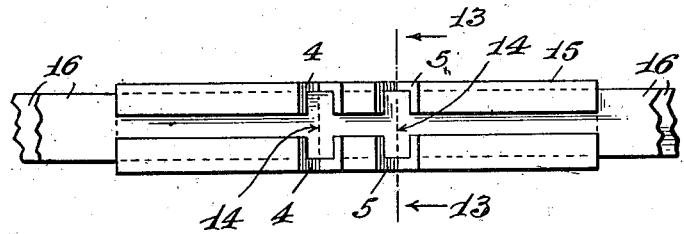  Fig. 13. 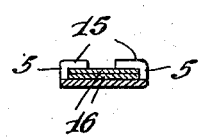

Inventor
WINFRED M. BROOKS
By his Attorney

Patented June 7, 1927.

1,631,464

UNITED STATES PATENT OFFICE.

WINFRED M. BROOKS, OF WEST ORANGE, NEW JERSEY.

SEALING MEANS.

Application filed November 11, 1925. Serial No. 68,269.

This invention relates to sealing means and has for its main object and feature a device the parts of which may be readily assembled and sealed without necessity of clamping or pressing them together, and the sealing operation being one of bending may be carried out without the use of tools.

In the accompanying drawings the invention is embodied in a number of preferred forms in which Fig. 1 is a view in plan elevation of a simple form of the invention, showing the sealing member and the element to be sealed assembled but before the bending operation has taken place:

Fig. 2 is a transverse sectional view on the plane of line 2—2 of Fig. 1:

Fig. 3 shows the assembly bent back upon itself or doubled up and the seal formed:

Fig. 4 is a view similar to Fig. 1 but showing a modified form involving a double sealing member:

Fig. 5 is a transverse sectional view on the plane of line 5—5 of Fig. 4:

Fig. 6 is a view similar to Fig. 1 but showing a wing forming a part of the sealing member for the purpose of receiving designation symbols:

Fig. 7 is a transverse sectional view on the plane of line 7—7 of Fig. 6:

Fig. 8 is a view similar to Fig. 4 but showing a webbing interposed between the two tubes of the double sealing member:

Fig. 9 is a transverse sectional view on the plane of line 9—9 of Fig. 8:

Fig. 10 is a view similar to Fig. 8 but showing the tubes flaring:

Fig. 11 is a view similar to Fig. 4 but showing the bending lines offset from the center of the sealing member:

Fig. 12 is a plan view in elevation of a modified form of the invention involving the use of a flat sleeve sealing member and flat sealing elements:

Fig. 13 is a transverse sectional view on the plane of line 13—13 of Fig. 12:

Figure 14:
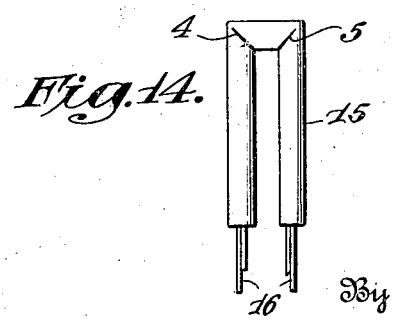
Fig. 14 is a view of the assembly of Fig. 12 bent up or doubled back on itself and the seal formed.

Taking up first the simple form of the invention shown in Figs. 1 to 3 inclusive, it will be seen that 1 indicates a sealing member here consisting of sheet material such as steel, copper or aluminum formed into a tube-like member or, however formed, having a duct 2. 3 is an element to be sealed shown here as a shackle and may consist of a metallic wire or strip, round or flat, or of fibrous or other material. The two ends of the shackle are threaded through the tube as indicated in Fig. 1 and the assembly is then bent back or doubled up on itself thereby sealing the parts. In the form shown herein, the sealing member is provided with two substantially parallel and spaced-apart bending lines formed by two sets of oppositely tapering cut-away portions 4 and 5 that partially sever the wall of the tube. The ends of the shackle are threaded across the plane of the bending lines and, when the sealing member is bent it assumes the form of a rectangle having an open end, the taper faces of each set of cut-away portions being brought together and the element to be sealed is doubled up in the act of bending the sealing member. It will be seen that no pressing or clamping of the element to be sealed with respect to the sealing member is necessary and that, nevertheless, element 3 is locked within member 1. Also, the material of member 1 is so weakened by the cut-away portions or by additional scoring that, when it is attempted to unbend the parts, said member 1 inevitably breaks, thereby indicating that the device has been tampered with. The sealing member being made of sheet material, its back 6 may be utilized for the designation symbols of the shipper or the carrier.

In Figs. 4 and 5, the sealing member is provided with two tubes 7 and 8 through each of which one prong of shackle 3 extends. Both tubes are provided with bending lines and the two tubes are bent jointly.

In Figs. 6 and 7, the sealing member consists of a strip of sheet metal 9 upon which is placed a body of lead 10 that forms a tube or tunnel for the reception of shackle 3. The advantage of this construction is that member 9 forms a wing of relatively great dimensions on which designation symbols may be placed.

In Figs. 8 and 9, two tubes 7 and 8 are employed; but instead of being close together, as in Fig. 4, they are separated by a webbing 11 for use as a field for designation symbols.

In Fig. 10, the arrangement is the same as in Fig. 8 except that tubes 12 and 13 are flaring to render threading of the shackle therethrough easier.

In Figs. 6, 8 and 10, the wing 9 or webbing 11 may be provided with scoring 14 to assume proper weakening of the parts or to define the bending line more clearly.

In Fig. 11, the arrangement is similar to that of Fig. 4 except that the cut-away portions are offset at one side of the tubes.

In Figs. 12, 13 and 14, still another form of the invention is shown in which the tube-like sealing member consists of a flat open face sleeve 15 of sheet material through which are threaded, in superposed relation, flat strips 16 of a shackle. The sleeve may be provided with bending lines as in the other forms and is doubled up in the same manner.

I claim:

1. Sealing means including: a sealing member provided with a duct and having two sets of oppositely tapering cut-away portions at an angle to the lengthwise axis of the duct, said cut-away portions forming two substantially parallel spaced-apart bending lines, and an element to be sealed insertable lengthwise in said duct before bending the member, extending across the plane of said bending lines and sealed by bending the member, and therewith the element to be sealed, on both bending lines to thereby cause the taper faces of each set of cut-away portions to close up against each other and the member to assume the shape of an open rectangle.

2. Sealing means including: a tube-like member having two sets of oppositely tapering cut-away portions at an angle to its lengthwise axis, said cut-away portions partly severing the wall of the tube-like member and forming two substantially parallel spaced-apart bending lines, and an element to be sealed insertable lengthwise in said tube-like member before bending it, extending across the plane of said bending lines and sealed by bending the member, and therewith the element to be sealed, on both bending lines to thereby cause the taper faces of each set of cut-away portions to close up against each other and the member to assume the shape of an open rectangle.

Signed at New York, in the county of New York and State of New York, this 5th day of November, 1925.

WINFRED M. BROOKS.